(12) United States Patent
Pheil et al.

(10) Patent No.: US 11,490,676 B2
(45) Date of Patent: Nov. 8, 2022

(54) AUTOLACING FOOTWEAR MOTOR HAVING ROTARY DRUM ENCODER

(71) Applicant: NIKE, Inc., Beaverton, OR (US)

(72) Inventors: Holli Pheil, Portland, OR (US); Summer L. Schneider, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/557,289

(22) Filed: Aug. 30, 2019

(65) Prior Publication Data

US 2020/0068983 A1 Mar. 5, 2020

Related U.S. Application Data

(60) Provisional application No. 62/725,733, filed on Aug. 31, 2018, provisional application No. 62/773,379, filed on Nov. 30, 2018.

(51) Int. Cl.
| | | |
|---|---|---|
| *A43B 3/00* | (2022.01) | |
| *A43C 11/16* | (2006.01) | |
| *A43B 3/34* | (2022.01) | |
| *A43C 7/08* | (2006.01) | |
| *G01D 5/26* | (2006.01) | |

(Continued)

(52) U.S. Cl.
CPC .................. *A43B 3/34* (2022.01); *A43C 7/08* (2013.01); *A43C 11/165* (2013.01); *F16G 11/00* (2013.01);
(Continued)

(58) Field of Classification Search
CPC ......... A43C 1/00; A43C 11/165; A43B 11/00; A43B 3/34
See application file for complete search history.

(56) References Cited

U.S. PATENT DOCUMENTS

| | | |
|---|---|---|
| 5,456,027 A | 10/1995 | Tecchio et al. |
| 9,730,484 B2 | 8/2017 | Dua et al. |
| | (Continued) | |

FOREIGN PATENT DOCUMENTS

| | | |
|---|---|---|
| CN | 103852090 | 6/2014 |
| CN | 112888333 | 6/2021 |
| | (Continued) | |

OTHER PUBLICATIONS

"Korean Application Serial No. 10-2021-7009455, Notice of Preliminary Rejection dated Jul. 9, 2021", With English translation, 5 pages.

(Continued)

*Primary Examiner* — Robert Sandy
*Assistant Examiner* — Michael S Lee
(74) *Attorney, Agent, or Firm* — Schwegman Lundberg & Woessner, P.A.

(57) ABSTRACT

An article of footwear and related method includes a midsole, an upper secured with respect to the midsole, and a lace extending through the upper. A motorized lacing system positioned within the midsole, configured to engage with the lace to increase and decrease tension on the lace. The motorized lacing system includes a motor, including a motor shaft, a spool, coupled to the motor shaft, configured to spool and unspool the lace based on the turning of the motor shaft, a processor circuit, and an optical encoder. The optical encoder comprises a three-dimensional encoder defining a major axis and having a surface having a first plurality of segments positioned between a second plurality of segments, and an optical sensor, positioned within optical range of the cylindrical encoder, configured to output a signal to the processor circuit indicative of a detected one of a first and second plurality of segments.

12 Claims, 10 Drawing Sheets

(51) Int. Cl.
  *F16G 11/10* (2006.01)
  *F16G 11/00* (2006.01)
  *F16G 11/12* (2006.01)
(52) U.S. Cl.
  CPC ............ *F16G 11/108* (2013.01); *F16G 11/12* (2013.01); *G01D 5/264* (2013.01)

(56) References Cited

U.S. PATENT DOCUMENTS

| | | | |
|---|---|---|---|
| 2005/0040323 A1* | 2/2005 | Chong | G01D 5/3473 250/231.13 |
| 2014/0026440 A1 | 1/2014 | Beers et al. | |
| 2014/0151540 A1 | 6/2014 | Holzapfel et al. | |
| 2016/0272458 A1 | 9/2016 | Beers et al. | |
| 2017/0265593 A1 | 9/2017 | Schneider et al. | |
| 2018/0172483 A1 | 6/2018 | Geiger et al. | |

FOREIGN PATENT DOCUMENTS

| | | |
|---|---|---|
| JP | H08254439 | 10/1996 |
| JP | 2005164588 | 6/2005 |
| JP | 2021527544 | 10/2021 |
| JP | 7087191 | 6/2022 |
| KR | 20210038714 | 4/2021 |
| KR | 102376818 B1 | 3/2022 |
| KR | 20220038533 A | 3/2022 |
| WO | 2017160708 | 9/2017 |
| WO | 2020047490 | 3/2020 |

OTHER PUBLICATIONS

"International Application Serial No. PCT US2019 049184, International Preliminary Report on Patentability dated Mar. 11, 2021", 6 pgs.

"Japanese Application Serial No. 2021-510902, Notification of Reasons for Refusal dated Oct. 5, 2021", With English translation, 7 pgs.

"International Application Serial No. PCT US2019 049184, International Search Report dated Dec. 20, 2019", 3 pgs.

"International Application Serial No. PCT US2019 049184, Written Opinion dated Dec. 20, 2019", 4 pgs.

"European Application Serial No. 19855487.5, Extended European Search Report dated Apr. 22, 2021", 9 pgs.

"Chinese Application Serial No. 201980067248.0, Response filed Apr. 2, 2022 to Office Action dated Dec. 2, 2021", w/ English claims, 16 pgs.

"European Application Serial No. 19855487.5, Response filed Nov. 26, 2021 to Extended European Search Report dated Apr. 22, 2021", 25 pgs.

"Korean Application Serial No. 10-2021-7009455, Response filed Dec. 6, 2021 to Notice of Preliminary Rejection dated Jul. 9, 2021", w English claims, 18 pgs.

"Chinese Application Serial No. 201980067248.0, Office Action dated Dec. 2, 2021", With English translation, 11 pgs.

"European Application Serial No. 19855487.5, Communication Pursuant to Article 94(3) EPC dated Jan. 18, 2022", 7 pgs.

"Japanese Application Serial No. 2021-510902, Response filed Feb. 4, 2022 to Notification of Reasons for Refusal dated Oct. 5, 2021", w English Claims, 13 pgs.

"European Application Serial No. 19855487,5, Response filed May 16, 2022 to Communication Pursuant to Article 94(3) EPC dated Jan. 18, 2022", 17 pgs.

"Japanese Application Serial No. 2022-092880, Voluntary Amendment filed Jul. 7, 2022", w English claims, 27 pgs.

\* cited by examiner

AUTOLACING FOOTWEAR MOTOR HAVING ROTARY DRUM ENCODER

PRIORITY APPLICATIONS

This application claims the benefit of priority to U.S. Provisional Patent Application Ser. No. 62/725,733, filed Aug. 31, 2018, the content of which is incorporated herein by reference in its entirety.

TECHNICAL FIELD

The subject matter disclosed herein generally relates to an article of footwear having an autolacing motor using an optical encoder based on a rotary drum.

BRIEF DESCRIPTION OF THE DRAWINGS

Some embodiments are illustrated by way of example and not limitation in the figures of the accompanying drawings.

DETAILED DESCRIPTION

Figure 1:
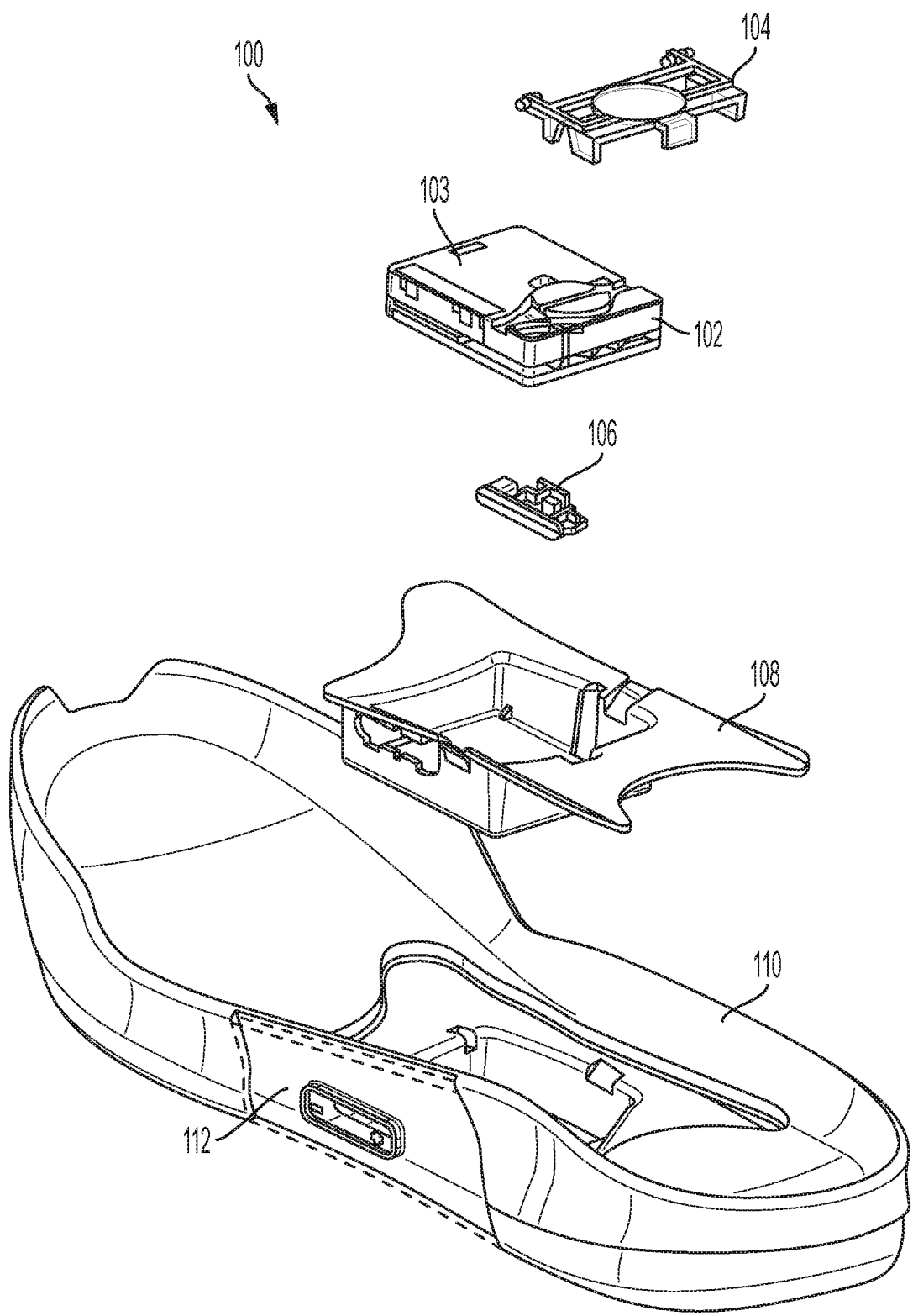
FIG. 1 is an exploded view illustration of components of a motorized lacing system for an article of footwear, in an example embodiment.

Example methods and systems are directed to an article of footwear having an autolacing motor using an optical encoder based on a rotary drum. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Articles of footwear, such as shoes, may include a variety of components, both conventional and unconventional. Conventional components may include an upper, a sole, and laces or other securing mechanisms to enclose and secure the foot of a wearer within the article of footwear. Unconventionally, a motorized lacing system may engage with the lace to tighten and/or loosen the lace. Additional or alternative electronics may provide a variety of functionality for the article of footwear, including operating and driving the motor, sensing information about the nature of the article of footwear, providing lighted displays and/or other sensory stimuli, and so forth.

In general, and particularly for articles of footwear oriented toward the performance of athletic activities, characteristics such as the size, form, robustness, and weight of the article of footwear may be of particular importance. Where the components of the article of footwear promote, for instance, a relatively tall, heavy, and/or fragile article of footwear, the capacity of the article of footwear to be effective in the performance of the athletic activity may be compromised.

One type of component that may be utilized within the context of electronics of an article of footwear, including within the motorized lacing system, is an optical encoder. An optical encoder may be utilized to track rotational movement of the motor and/or, e.g., a spool coupled to the motor and on which the lace is wound and unwound. By tracking the revolutions of the motor and/or the spool, a controller may obtain information about how much more the motor and/or spool may be turned to achieve a desired configuration of the lace. However, conventional optical encoders may create issues for the article of footwear such as those described above, including having a relatively high stack up and being relatively fragile.

Conventional optical encoders may be planar, e.g., a circle. The optical encoder may spin on an axis of the circle and an optical sensor positioned above or below the circle may sense the passage of the portions of the encoder. A three-dimensional optical encoder has been developed in the general shape of a drum or cylinder. As will be described in detail herein, the three-dimensional optical encoder may provide both ease of manufacture as well as an implementation that is both more compact than a conventional two-dimensional optical encoder and greater robustness.

FIG. 1 is an exploded view illustration of components of a motorized lacing system for an article of footwear, in an example embodiment. While the system is described with respect to the article of footwear, it is to be recognized and understood that the principles described with respect to the article of footwear apply equally well to any of a variety of wearable articles. The motorized lacing system 100 illustrated in FIG. 1 includes a lacing engine 102 having a housing structure 103, a lid 104, an actuator 106, a mid-sole plate 108, a mid-sole 110, and an outsole 112. FIG. 1 illustrates the basic assembly sequence of components of an automated lacing footwear platform. The motorized lacing system 100 starts with the mid-sole plate 108 being secured within the mid-sole. Next, the actuator 106 is inserted into an opening in the lateral side of the mid-sole plate opposite to interface buttons that can be embedded in the outsole 112. Next, the lacing engine 102 is dropped into the mid-sole plate 108. In an example, the lacing system 100 is inserted under a continuous loop of lacing cable and the lacing cable is aligned with a spool in the lacing engine 102 (discussed below). Finally, the lid 104 is inserted into grooves in the mid-sole plate 108, secured into a closed position, and latched into a recess in the mid-sole plate 108. The lid 104 can capture the lacing engine 102 and can assist in maintaining alignment of a lacing cable during operation.

Figure 2:
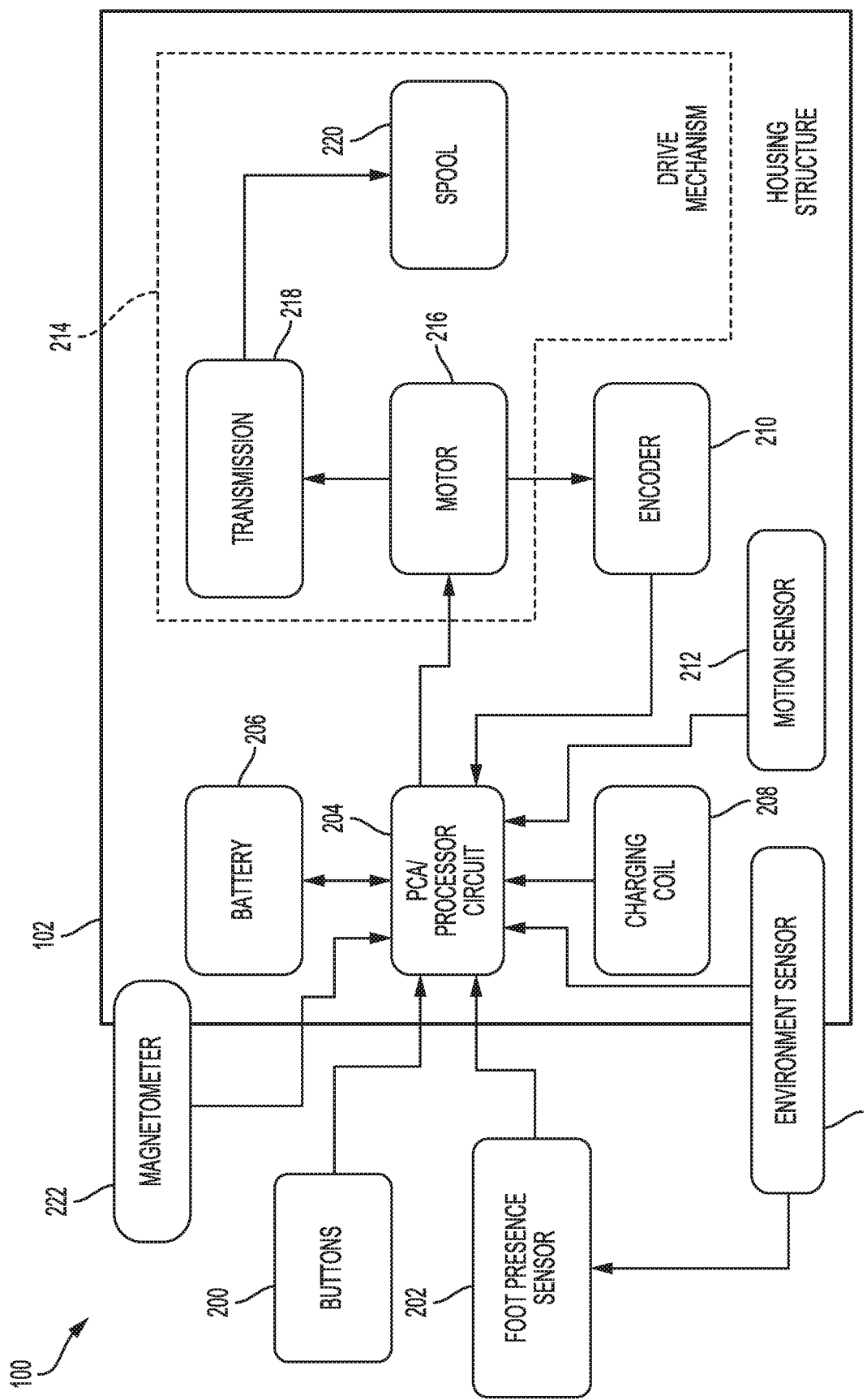
FIG. 2 illustrates generally a block diagram of components of a motorized lacing system, in an example embodiment.

FIG. 2 illustrates generally a block diagram of components of a motorized lacing system 100, in an example embodiment. The system 100 includes some, but not necessarily all, components of a motorized lacing system such as including interface buttons 200, a foot presence sensor 202, and the lacing engine housing 102 enclosing a printed circuit board assembly (PCA) with a processor circuit 204, a battery 206, a receive coil 208, an optical encoder 210, a motion sensor 212, and a drive mechanism 214. The optical encoder 210 may include an optical sensor and an encoder having distinct portions independently detectable by the optical sensor. The drive mechanism 214 can include, among other things, a motor 216, a transmission 218, and a lace spool 220. The motion sensor 212 can include, among other things, a single or multiple axis accelerometer, a magnetometer, a pyrometer, or other sensor or device configured to sense motion of the housing structure 102, or of one or more components within or coupled to the housing structure 102. In an example, the motorized lacing system 100 includes a magnetometer 222 coupled to the processor circuit 204.

In the example of FIG. 2, the processor circuit 204 is in data or power signal communication with one or more of the interface buttons 200, foot presence sensor 202, battery 206, receive coil 208, and drive mechanism 214. The transmission 218 couples the motor 216 to a spool to form the drive mechanism 214. In the example of FIG. 2, the buttons 200, foot presence sensor 202, and environment sensor 224 are shown outside of, or partially outside of, the lacing engine 102.

In an example, the receive coil 208 is positioned on or inside of the housing 103 of the lacing engine 102. In various examples, the receive coil 208 is positioned on an outside major surface, e.g., a top or bottom surface, of the housing 103 and, in a specific example, the bottom surface. In various examples, the receive coil 208 is a qi charging coil, though any suitable coil, such as an A4WP charging coil, may be utilized instead.

In an example, the processor circuit 204 controls one or more aspects of the drive mechanism 214. For example, the processor circuit 204 can be configured to receive information from the buttons 200 and/or from the foot presence sensor 202 and/or from the motion sensor 212 and, in response, control the drive mechanism 214, such as to tighten or loosen footwear about a foot. In an example, the processor circuit 204 is additionally or alternatively configured to issue commands to obtain or record sensor information, from the foot presence sensor 202 or other sensor, among other functions. In an example, the processor circuit 204 conditions operation of the drive mechanism 214 on (1) detecting a foot presence using the foot presence sensor 202 and (2) detecting a specified gesture using the motion sensor 212.

Information from the environment sensor 224 can be used to update or adjust a baseline or reference value for the foot presence sensor 202. As further explained below, capacitance values measured by a capacitive foot presence sensor can vary over time, such as in response to ambient conditions near the sensor. Using information from the environment sensor 224, the processor circuit 204 and/or the foot presence sensor 202 can update or adjust a measured or sensed capacitance value.

Figure 3:
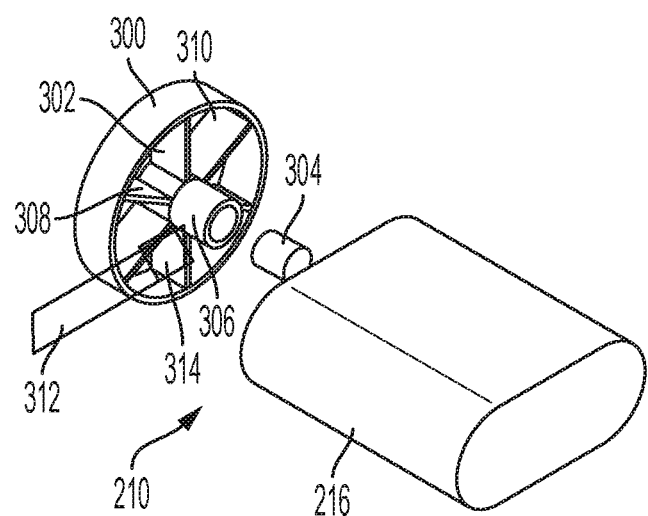
FIG. 3 is a depiction of an optical encoder including a two-dimensional disk, in an example embodiment.

FIG. 3 is a depiction of an optical encoder 300 including a two-dimensional disk 302, in an example embodiment. The optical encoder 300 may operate as the optical encoder 210 in the block diagram of FIG. 2. The two-dimensional disk 302 is positioned with a major surface 304 facing toward the motor 216 with a shaft 306 of the motor 216 that engages with the transmission 218 (not depicted) extending through the approximate center 308 of the disk 302. The disk 302 is secured to the shaft 306 so that when the shaft 306 turns so does the disk 302. The disk 302 includes a plurality of alternately dark segments 310 and reflective segments 312. An optical sensor 314 is positioned on a printed circuit board (PCB) 316. The printed circuit board 316 may, owing to the orientation of the optical sensor 314 in relation to the disk 302, be a different PCB than the PCB on which the processor circuit 204 and other components are positioned.

As the motor 216 turns the shaft 306 the disk 302 turns as well, causing the dark and reflective segments 310, 312 to pass by the optical sensor 314 in turn. The optical sensor 314 outputs a signal indicative of each segment 310, 312 that passes to the processor circuit 204. The processor circuit 204 may be keyed to the passage of each segment 310, 312 to identify how much the shaft 306 has turned and, by extension, how much the spool 220 will have turned.

However, the optical encoder 210 with the two-dimensional disk 302 may carry several disadvantages in relation to an optical encoder 210 having a three-dimensional disk 302, as disclosed herein. In particular, the challenges of manufacturing the disk 302 precisely may raise costs and reduce reliability. Imprecise or "fuzzy" edges between segments 310, 312 may provide for unreliability in the optical sensor 314 identifying each segment 310, 312 as that segment 310, 312 transitions within the view of the optical sensor 314.

Figure 4:
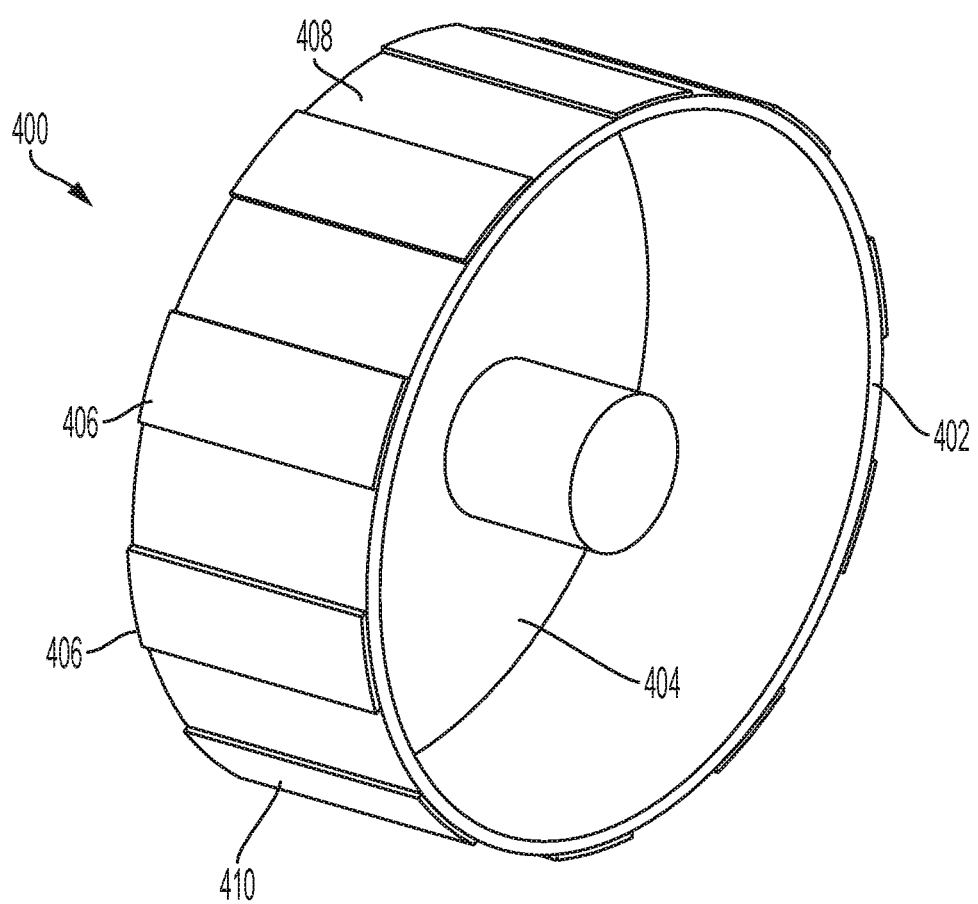
FIG. 4 is a depiction of a three-dimensional encoder, in an example embodiment.

FIG. 4 is a depiction of a three-dimensional encoder 400, in an example embodiment. The three-dimensional encoder 400 is a drum encoder, including a drum portion 402 and a securing portion 404 coupled to the cylindrical portion and configured to secure the three-dimensional encoder 400 to e.g., the motor shaft 306. The securing portion may be solid or may be individual portions that extend between the drum portion 402 and the shaft 306, e.g., spokes or the like.

As illustrated, the drum portion 402. Is cylindrical and has a circular cross section, though any of a variety of suitable geometries are contemplated, including conical, octagonal, and the like. As with the two-dimensional disk 300, the drum 400 includes a first plurality of segments 406, e.g., dark segments, alternatingly positioned between a second plurality of segments 408, e.g., reflective segments. The first and second plurality of segments 406, 408 are positioned on an exterior surface 410 of the drum portion 402.

Figure 5:
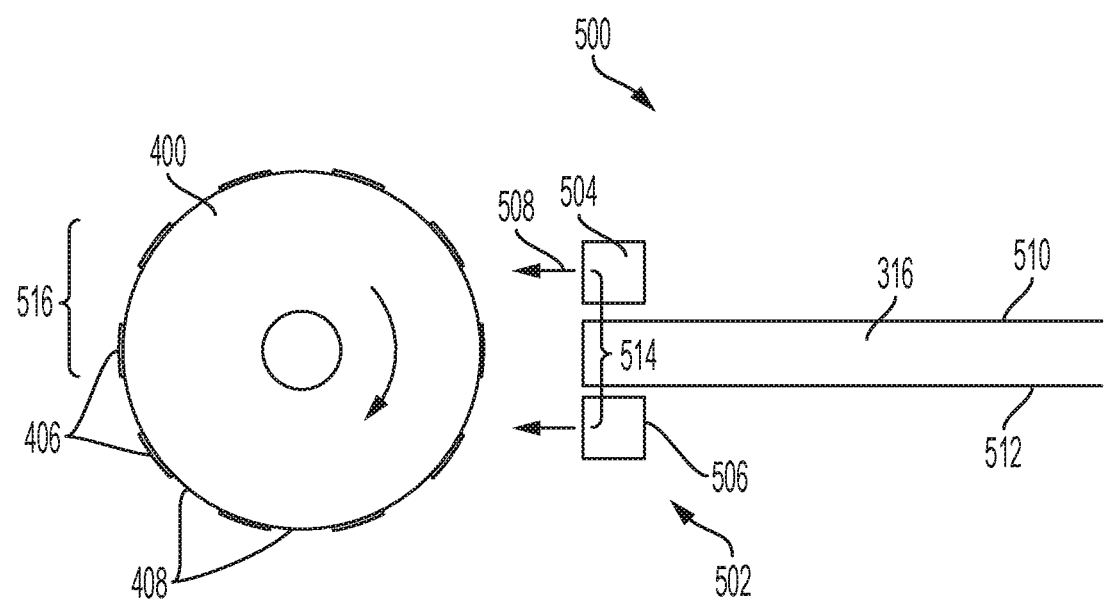
FIG. 5 is a depiction of an optical encoder, including the three-dimensional encoder, in an example embodiment.

FIG. 5 is a depiction of an optical encoder 500, including the three-dimensional encoder 400, in an example embodiment. The optical encoder 500 may operate as the optical encoder 210 in the block diagram of FIG. 2. In addition to the three-dimensional encoder 400, the optical encoder 500 includes an optical sensor 502, including a first optical sensor 504 and a second optical sensor 506 each within an optical range 508 of the three-dimensional encoder 400, the optical range 508 being a distance over which the first and second optical sensors 504, 506 can differentiate between the first and second plurality of segments 406, 408. As such, the optical range 508 will be different between and among different types of first and second optical sensors 504, 506. In the event that external design requirements may necessitate a specific distance between the optical sensor 502 and the three-dimensional encoder 400, first and second optical sensors 504, 506 may be selected that have an optical range 508 at least as long as the distance.

The first optical sensor 504 is positioned on a first major surface 510 of the PCB 316 while the second optical sensor 508 is positioned on a second major surface 512 of the PCB 316. In the illustrated example, the first and second optical sensors 504, 506 have a vertical spacing 514 approximately equal to a height 516 of each individual one of the first and second plurality of segments 406, 408, e.g., within approximately five (5) percent of the height 516. As such, each of the first and second optical sensors 504, 506 will both tend to detect the same type of segment, i.e., will both detect dark segments or reflective segments. If each of the first and second optical sensors 504, 506 do not detect the same type of segment, e.g., the first optical sensor 504 detects one of the first plurality of segments 406 and the second optical sensor 506 detects one of the second plurality of segments 408 (or vice versa), the inconsistency may be expected to be resolved soon in favor of both the first and second optical sensor 504, 506 detecting the same type of segment 406, 408.

While a particular configuration of the optical sensor 502 is illustrated, it noted and emphasized that the number and orientation of optical sensors may be varied between and among different implementations. Thus, in an example an alternative example of the optical sensor 502 may have only one individual optical sensor, while a further alternative example of the optical sensor 502 may include three or more individual optical sensors. However, in various examples, each optical sensor is positioned on one of the major surfaces 510, 512 of the PCB 316.

Figure 6A:
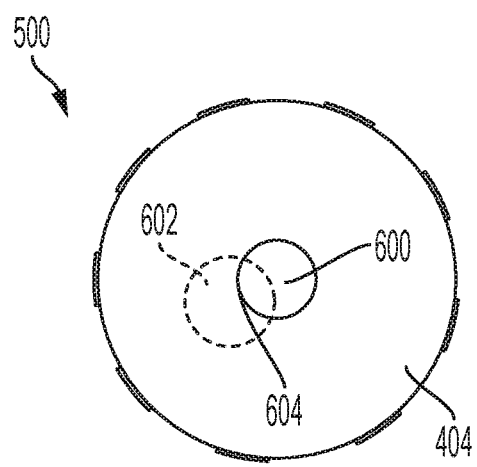
FIGS. 6A-6C illustrate the operation of an optical encoder which is off center relative to a major axis of the optical encoder, in an example embodiment.
Figure 6B:
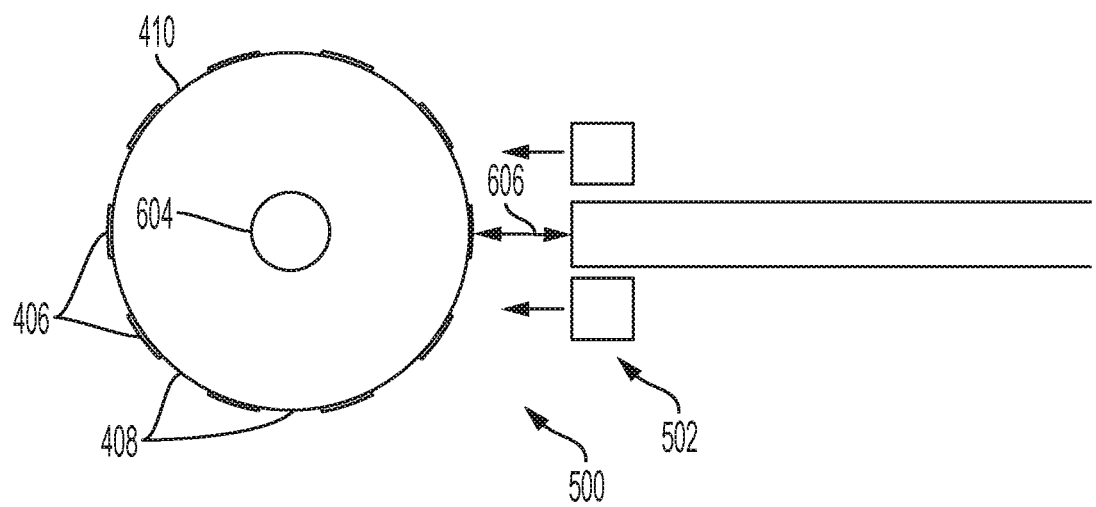
Figure 6C:
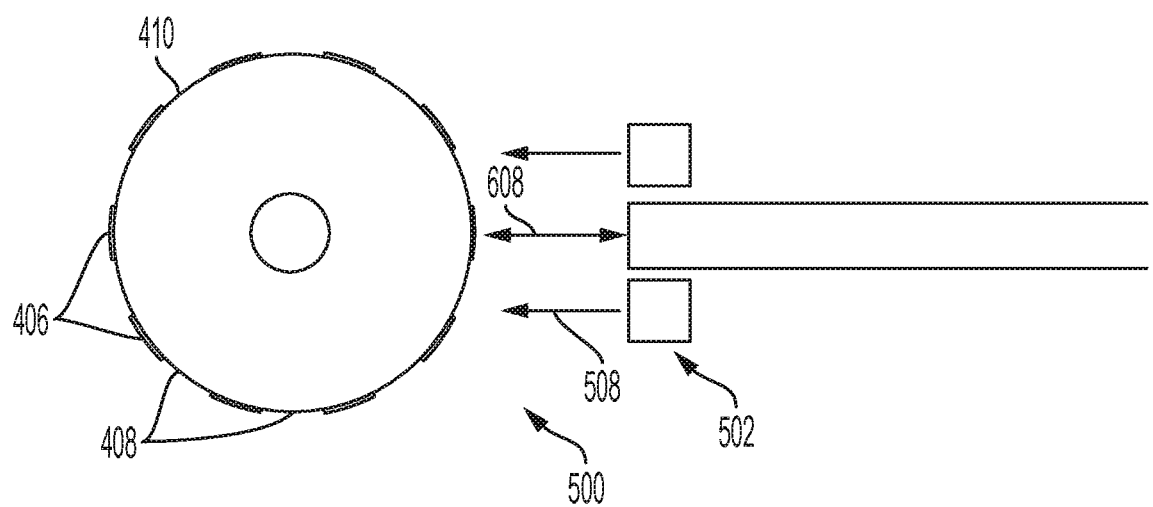

FIGS. 6A-6C illustrate the operation of an optical encoder 500 which is off center relative to a major axis 600 of the optical encoder 500, in an example embodiment. In FIG. 6A, a center 602 of an aperture 604 in the securing section 404 through which the motor shaft 306 (not picture) may pass is offset by distance relative to the major axis 600. In FIG. 6B, with the aperture 604 fixed about the shaft 306 (not pictured), the exterior surface 410 and, by extension, the first and second plurality of segments 406, 408, come to within a first distance 606 of the optical sensor 502. In FIG. 6C, the optical encoder 500 having completed a half-rotation relative to in FIG. 6B, the exterior surface 410 comes to within a second distance 608 of the optical sensor 502, the second distance 608 being greater than the first distance 606, owing to the off-center aperture 604 being fixed about the motor shaft 306. T Offsets between the major axis 600 and the center 602 of the aperture may be an unintended consequence of a manufacture process. However, because of the properties of the optical sensor 500, the apparent height 516 (FIG. 5) of each of the first and second plurality of segments 406, 408 may remain the same, in contrast to the changes in the apparent size of the segments 310, 312 of the disk 302. (FIG. 3) of the two-dimensional optical sensor 300 in the event of a similar offset. As a result, such concentricity issues may merely result in a difference in focal distance of the optical sensor 502. Differences in the focal distance may be resolved by the optical sensor 502 within the optical range 508 of the optical sensor 502. As such, the optical encoder 500 may allow for greater variance in a manufacturing process than may be allowed in a manufacturing process of the optical encoder 300, as well as be more robust to normal wear and tear during use.

Figure 7:
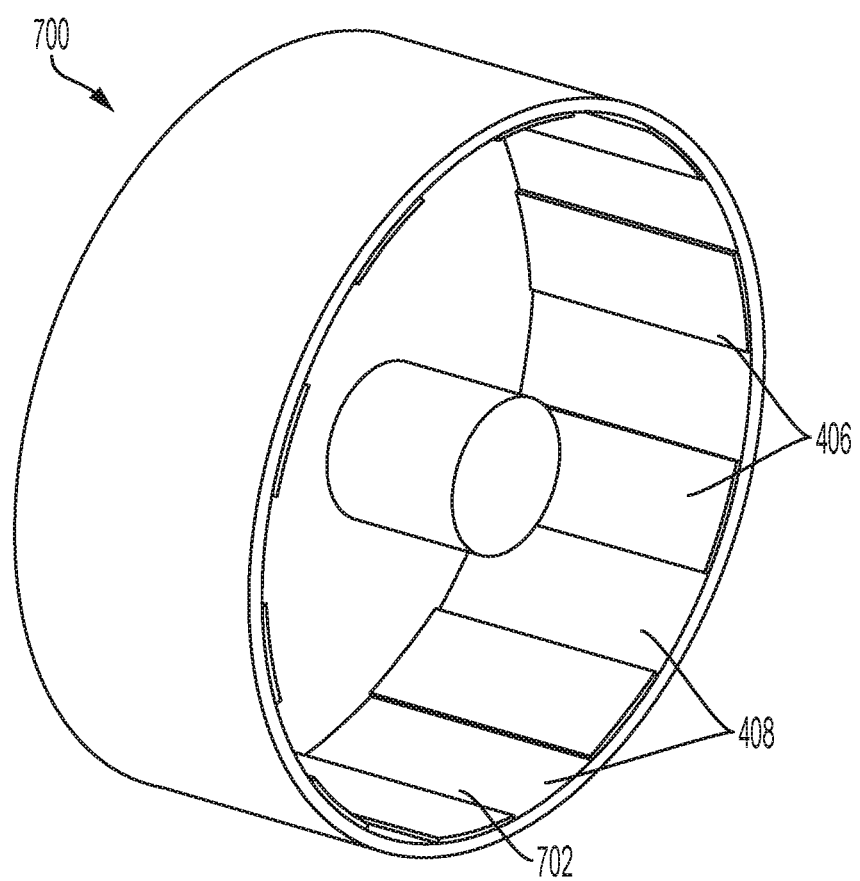
FIG. 7 is a depiction of an alternative example of a three-dimensional encoder, in an example embodiment.

FIG. 7 is a depiction of an alternative example of a three-dimensional encoder 700, in an example embodiment. The three-dimensional encoder 700 may otherwise have the same properties as the three-dimensional encoder 400. But rather than having the first and second plurality of segments 406, 408 on an outside surface of the drum portion 402, the three-dimensional encoder 700 includes the first and second plurality of segments 406, 408 on an interior surface 702. The three-dimensional encoder 700 may otherwise be utilized in an arrangement similar to that of the optical sensor 500, with the optical sensors 502 positioned to sense the interior surface 702.

Figure 8A:
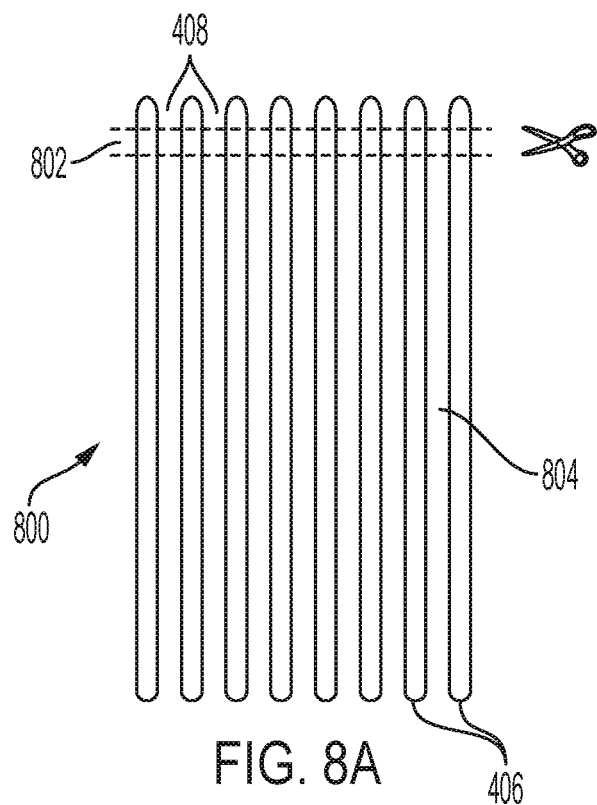
FIGS. 8A-8C illustrate a manufacturing process for the three-dimensional encoders, in an example embodiment.
Figure 8B:
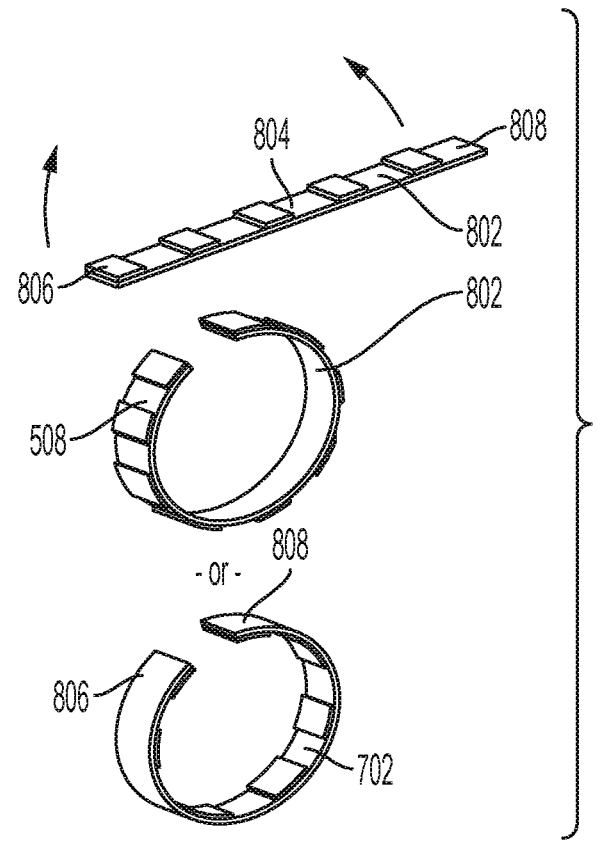
Figure 8C:
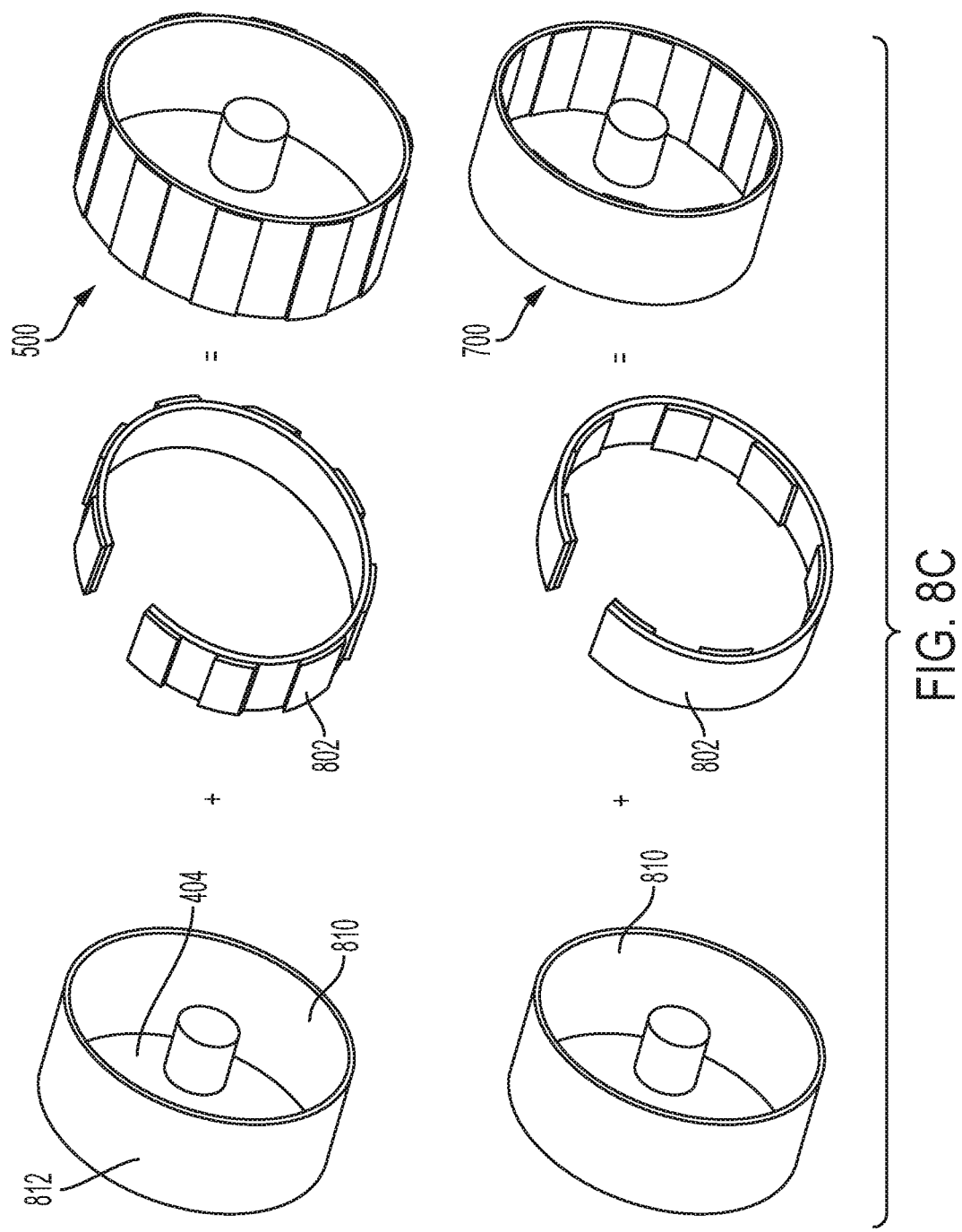

FIGS. 8A-8C illustrate a manufacturing process for the three-dimensional encoders 500, 700, in an example embodiment.

In FIG. 8A, a sheet 800 of elongate first and second plurality of segments 406, 408 is cut into individual strips 802. The sheet 800 is made of any suitable material, such as Mylar, and the dark segments, e.g., the first plurality of segments 406, are printed onto a major surface 804 of sheet 800. The reflective segments, e.g., the second plurality of segments 408, are untreated or substantially untreated Mylar.

In FIG. 8B, the strip 802 is folded so that the major surface 804, i.e., the printed side, is either on an exterior surface 508 or an interior surface 702, as desired. A first end 806 is secured to a second end 808 to make a loop.

In FIG. 8C, the strip 802 is coupled to a frame 810 to form the three-dimensional encoder 500, 700, as desired. The frame 810 includes the securing portion 404 and a drum 812 on which to fix the strip 802 to form the drum portion 402.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:
1. An article of footwear, comprising:
a midsole;
an upper secured with respect to the midsole;
a lace extending through the upper;
a motorized lacing system positioned within the midsole, configured to engage with the lace to increase and decrease tension on the lace, the motorized lacing system comprising:
a motor, including a motor shaft;
a spool, coupled to the motor shaft, configured to spool and unspool the lace based on the turning of the motor shaft;
a processor circuit; and
an optical encoder, comprising:
a three-dimensional encoder defining a major axis and having a surface having a first plurality of segments positioned between a second plurality of segments, the first plurality of segments having a different light reflecting characteristic than the second plurality of segments, the three-dimensional encoder secured to the motor shaft such that the turning of the motor shaft causes the three-dimensional encoder to rotate about the major axis; and
an optical sensor, positioned within optical range of the cylindrical encoder, configured to output a signal to the processor circuit indicative of a detected one of the first and second plurality of segments;
wherein the processor circuit is configured to operate the motor based, at least in part, on the signal as received from the optical sensor;

wherein the motorized lacing system comprises a printed circuit board (PCB) on which the processor circuit and the optical sensor are positioned; and wherein the optical sensor comprises a first optical sensor on a first major surface of the PCB and a second optical sensor on a second major surface of the PCB, the second major surface opposite the first major surface.

2. The article of footwear of claim 1, wherein the three-dimensional encoder forms a cylinder.

3. The article of footwear of claim 1, wherein a spacing between the first and second optical sensors is approximately the same as a spacing between adjacent ones of the first plurality of segments.

4. The article of footwear of claim 1, wherein the surface of the three-dimensional encoder faces away from the major axis.

5. A method for making an article of footwear, comprising:

securing a midsole with respect to an upper;
extending a lace through the upper;
positioning a motorized lacing system within the midsole, the motorized lacing system configured to engage with the lace to increase and decrease tension on the lace, the motorized lacing system comprising:
a motor, including a motor shaft;
a spool, coupled to the motor shaft, configured to spool and unspool the lace based on the turning of the motor shaft;
a processor circuit; and
an optical encoder, comprising:
a three-dimensional encoder defining a major axis and having a surface having a first plurality of segments positioned between a second plurality of segments, the first plurality of segments having a different light reflecting characteristic than the second plurality of segments, the three-dimensional encoder secured to the motor shaft such that the turning of the motor shaft causes the three-dimensional encoder to rotate about the major axis; and
an optical sensor, positioned within optical range of the cylindrical encoder, configured to output a signal to the processor circuit indicative of a detected one of the first and second plurality of segments;
wherein the processor circuit is configured to operate the motor based, at least in part, on the signal as received from the optical sensor;
wherein the motorized lacing system comprises a printed circuit board (PCB) on which the processor circuit and the optical sensor are positioned; and
wherein the optical sensor comprises a first optical sensor on a first major surface of the PCB and a second optical sensor on a second major surface of the PCB, the second major surface opposite the first major surface.

6. The method of claim 5, wherein the three-dimensional encoder forms a cylinder.

7. The method of claim 5, wherein a spacing between the first and second optical sensors is approximately the same as a spacing between adjacent ones of the first plurality of segments.

8. The method of claim 5, wherein the surface of the three-dimensional encoder faces away from the major axis.

9. A motorized lacing system, comprising:
a motor, including a motor shaft;
a spool, coupled to the motor shaft, configured to spool and unspool the lace based on the turning of the motor shaft;
a processor circuit; and
an optical encoder, comprising:
a three-dimensional encoder defining a major axis and having a surface having a first plurality of segments positioned between a second plurality of segments, the first plurality of segments having a different light reflecting characteristic than the second plurality of segments, the three-dimensional encoder secured to the motor shaft such that the turning of the motor shaft causes the three-dimensional encoder to rotate about the major axis; and
an optical sensor, positioned within optical range of the cylindrical encoder, configured to output a signal to the processor circuit indicative of a detected one of the first and second plurality of segments;
wherein the processor circuit is configured to operate the motor based, at least in part, on the signal as received from the optical sensor;
wherein the motorized lacing system comprises a printed circuit board (PCB) on which the processor circuit and the optical sensor are positioned; and
wherein the optical sensor comprises a first optical sensor on a first major surface of the PCB and a second optical sensor on a second major surface of the PCB, the second major surface opposite the first major surface.

10. The motorized lacing system of claim 9, wherein the three-dimensional encoder forms a cylinder.

11. The motorized lacing system of claim 9, wherein a spacing between the first and second optical sensors is approximately the same as a spacing between adjacent ones of the first plurality of segments.

12. The motorized lacing system of claim 9, wherein the surface of the three-dimensional encoder faces away from the major axis.

* * * * *